United States Patent [19]

Sugiyama et al.

[11] Patent Number: 4,489,398
[45] Date of Patent: Dec. 18, 1984

[54] ADDRESS INDICATOR CONTROL DEVICE IN A ROTARY RECORDING MEDIUM REPRODUCING APPARATUS

[75] Inventors: Hiroyuki Sugiyama, Isehara; Masaki Sakurai; Ryozo Abe, both of Yokohama; Kenji Yoshihara, Chiba, all of Japan

[73] Assignee: Victor Company of Japan, Ltd., Yokohama, Japan

[21] Appl. No.: 387,550

[22] Filed: Jun. 11, 1982

[30] Foreign Application Priority Data

Jun. 15, 1981 [JP] Japan .................. 56-91917

[51] Int. Cl.³ .................. G11B 21/02; H04N 5/78
[52] U.S. Cl. .................. 369/32; 358/342
[58] Field of Search .................. 358/342, 335; 360/18, 360/27, 48, 72.1, 72.2; 369/32, 33, 43–44, 46–49, 53, 54, 59

[56] References Cited

U.S. PATENT DOCUMENTS

| 3,931,457 | 1/1976 | Mes .................. 358/342 |
| 4,296,491 | 10/1981 | Jerome .................. 358/342 X |
| 4,356,521 | 10/1982 | Selim .................. 360/72.2 |
| 4,413,292 | 11/1983 | Sugiyama et al. .................. 358/342 X |

Primary Examiner—Aristotelis M. Psitos
Attorney, Agent, or Firm—Posnack, Roberts, Cohen & Spiecens

[57] ABSTRACT

An address indicator control device in a rotary recording medium reproducing apparatus having a reproducing transducer for reproducing a rotary recording medium recorded with at least two kinds of address signals together with an information signal, a circuit for transferring the reproducing transducer to a set address position on the rotary recording medium reproducing apparatus to carry out a search operation, and an indicator for indicating an address, comprises an indication mode setting circuit for setting the kind of address to be indicated on the indicator, a search address setting circuit for setting the kind of address to be searched and the address value, an address signal separation circuit for separating an address signal from a signal reproduced from the rotary recording medium by the reproducing transducer, and a control circuit for indicating an address of the kind and value set by the search address setting circuit on the indicator regardless of the setting by the indication mode setting circuit, at lease during the search operation of the reproducing transducer, and until a predetermined time has elapsed from the start of the search operation when the duration of the search operation is shorter than the above predetermined time.

6 Claims, 12 Drawing Figures

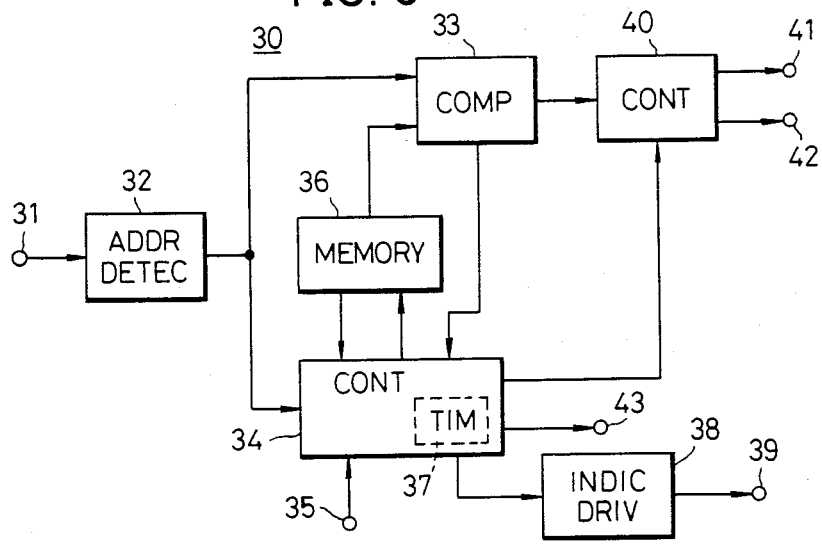
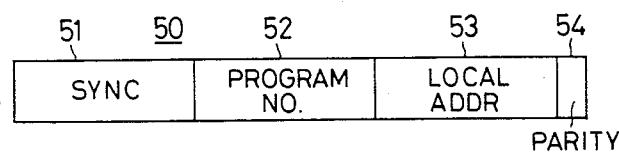
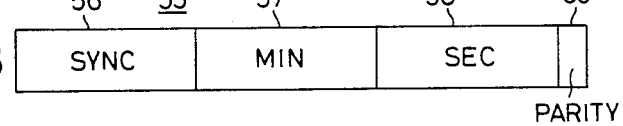
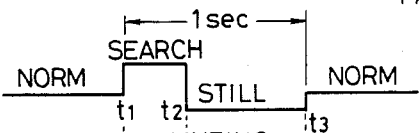
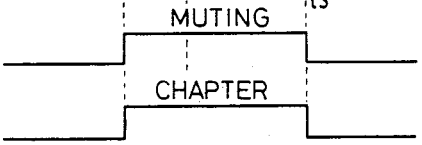
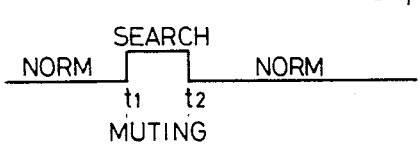
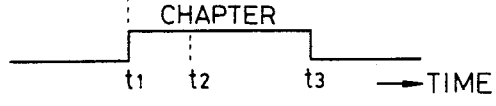

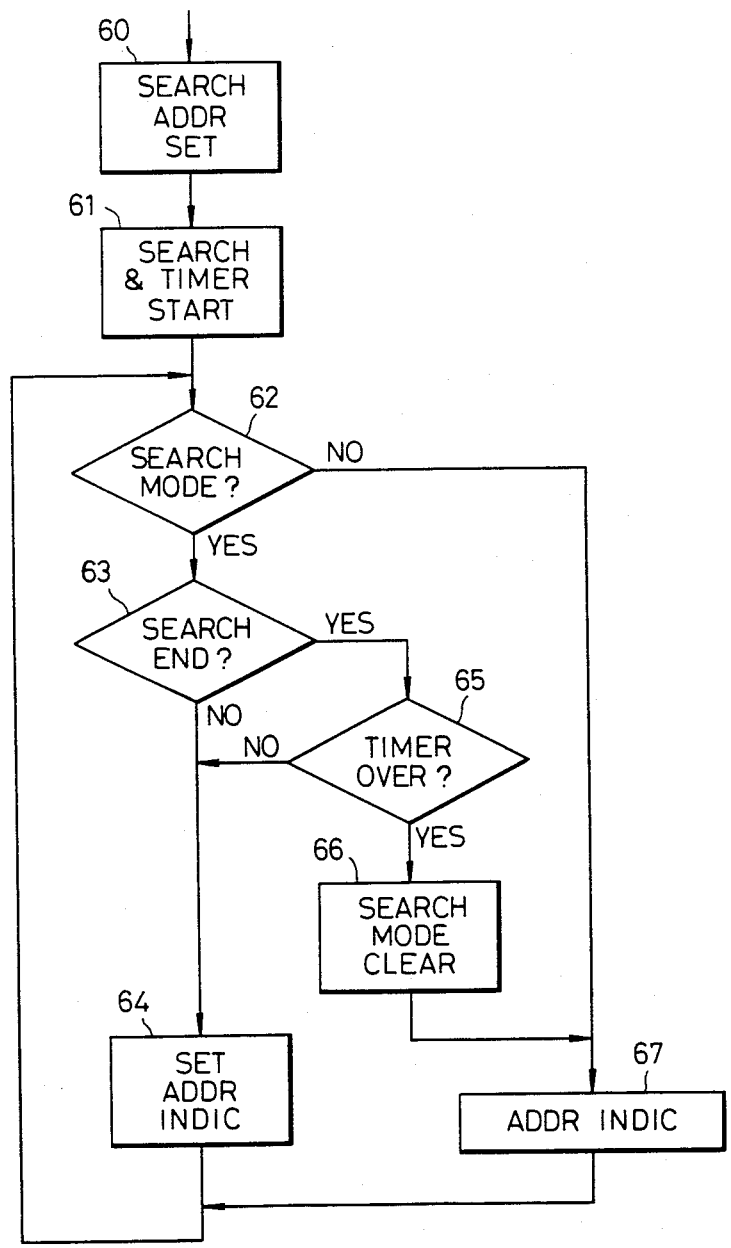

ADDRESS INDICATOR CONTROL DEVICE IN A ROTARY RECORDING MEDIUM REPRODUCING APPARATUS

BACKGROUND OF THE INVENTION

The present invention generally relates to address indicator control devices in rotary recording medium reproducing apparatuses, and more particularly to an address indicator control device capable of indicating a predetermined address for a predetermined time period, even when search with respect to a preset address is completed within an exceedingly short period of time, in a rotary recording medium reproducing apparatus having an address indicator device for selectively indicating one address among a plurality of addresses.

A new information signal recording and/or reproducing system has been proposed in U.S. Pat. Nos. 4,315,283 and 4,322,836, of which the assignee is the same as that of the present application. According to this proposed system, the recording system forms pits in accordance with an information signal being recorded along a spiral track on a flat rotary recording medium (hereinafter simply referred to as a disc), without forming a groove therein. In the reproducing system, a reproducing stylus traces over along this track to reproduce the recorded information signal in response to variations in electrostatic capacitance.

In this system, since no grooves for guiding the reproducing stylus are provided on the disc, it becomes necessary to record pilot or reference signals on or in the vicinity of a track of a program information signal, on the disc. Upon reproduction, the reference signals are reproduced together with the program information signal. Tracking control is carried out so that the reproducing stylus accurately traces along the track in response to the reproduced reference signals.

By use of this previously proposed system, there is no possibility whatsoever of the reproducing stylus or the disc being damaged, since the recording track has no groove. The reproducing stylus can trace the same portion of the track repeatedly many times, whereby a special reproduction such as still, slow-motion, or quick-motion reproduction becomes possible. Moreover, operations such as a random access, high-speed search, and automatic cueing operation in which the reproducing stylus is shifted to a position of a desired recorded program where the reproduction is to be started, can be performed with ease.

In order to perform operations such as the above random access, high-speed search, and automatic cueing operations, signals such as an address signal (hereinafter referred to as a chapter address signal) for indicating the position of the recorded program number, and an address signal (hereinafter referred to as a time address signal) for indicating the position within the recorded program in reproducing time position from the start of that recorded program or in reproducing time position (hereinafter referred to as a time address) from the start of the first program recorded on the disc, are recorded onto the disc.

If two indicator devices are respectively provided exclusively for indicating the above chapter address and the time address in the disc reproducing apparatus, this will increase the manufacturing cost and be fruitless. Accordingly, a single address indicator device is generally provided to selectively indicate the chapter address and the time address.

In the above address indicator device, the indicator device indicates the time address when the indication mode of the indicator device is a time address indication mode, for example. In this state, when a desired program chapter is to be searched, for example, a chapter address is set. Next, when a search operation is started, the indicator device indicates the set chapter address, and a reproducing transducer is moved at a high speed. When the search by the reproducing transducer with respect to the set chapter address is completed, the indicator device again indicates the time address on the disc where the movement of the reproducing transducer is completed, according to the indication mode which has been preset.

For example, in a case where the reproducing transducer is at a position on the disc where the chapter address is "12" and the time address is "15 minutes and 42 seconds" and the indication mode of the indicator device is a time address indication mode, the indicator device indicates "15 minutes and 42 seconds". Hence, if the program chapter "15" is to be searched, for example, the chapter address "15" is set. Then, the indicator device indicates the set chapter address "15" when the reproducing apparatus is operated to perform the search, and this indication of the set chapter address remains during the period when the reproducing apparatus is performing the serach operation. Upon completion of the search operation, the indicator device indicates the time address at the beginning of the chapter address "15", that is, "19 minutes and 10 seconds", for example, and thereafter continues to indicate the time address.

In the above example, assume that the time address "15" is close to the end of the program chapter "12" and the program chapter "13" is set as the chapter to be searched. In this case, the search will be performed when the reproducing apparatus is operated to perform the search operation, however, the reproducing transducer will reach a position at the beginning of the program chapter "13" within an exceedingly short period of time. Thus, the duration of the search operation will be 0.1 seconds, for example, which is exceedingly short. Here, the indicator device will indicate the program chapter "13" upon starting of the search operation, but the indication in the indicator device will be returned to the time address indication after an exceedingly short time period of 0.1 seconds, for example. Accordingly, the indication of the program chapter which is to be searched is only obtained for an exceedingly short period of time. Hence, there was a disadvantage in that it became difficult for the operator to check with the indicator device which program chapter was actually searched.

SUMMARY OF THE INVENTION

Accordingly, it is a general object of the present invention to provide a novel and useful address indicator control device in a rotary recording medium reproducing apparatus, in which the above described disadvantages have been overcome.

Another and more specific object of the present invention is to provide an address indicator control device in which, in a state where an indicator device is in a mode for indicating one kind of address and another kind of address is set as an address to be searched, the indicator device indicates this other kind of address for a predetermined time period even if a search operation is completed within an exceedingly short period of time, in an apparatus for reproducing a rotary recording medium recorded with signals indicating at least two kinds of addresses. According to the control device of the present invention, the operator can check the set address with the indicator device even if the search operation is completed within an exceedingly short period of time, because the indicator device indicates the set address for a predetermined time period.

Other objects and further features of the present invention will be apparent from the following detailed description when read in conjunction with the accompanying drawings.

BRIEF DESCRIPTION OF THE DRAWINGS

FIG. 3 is a systematic block diagram showing an embodiment of an address indicator control device according to the present invention;

FIGS. 4A and 4B respectively are diagrams for explaining the chapter address signal and the time address signal;

FIGS. 5A, 5B, and 5C respectively show signal waveforms for explaining the operation of the block system shown in FIG. 3;

FIGS. 6A, 6B, and 6C respectively show signal waveforms for explaining modifications of the operation shown in FIGS. 5A and 5B; and FIG. 7 is a flow chart for explaining the operation when the essential part of the address indicator control device according to the present invention is constructed by a micro-computer.

DETAILED DESCRIPTION

Figure 1:
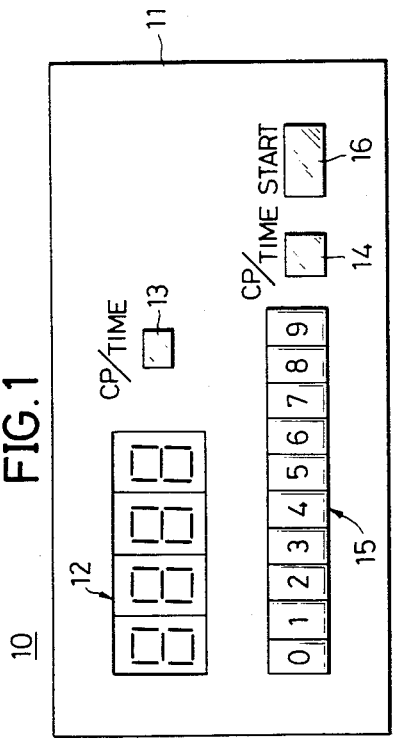
FIG. 1 is a front view showing an example of an address indicator device.

An example of an address indicator device which is subjected to indication control by an address indication control device according to the present invention, is shown in FIG. 1. For example, a four-figure indicator 12 comprising a seven-segment indicator element, is provided on an indicator panel 11 of an address indicator device 10. By manipulating an address indication mode switching button 13, the indication mode of the indicator 12 is either switched to the time address indication or the chapter address indication. When the indicator device 12 is in the time address indication mode by the manipulation of the button 13, the time address at a position on a disc where a reproducing transducer of a reproducing apparatus is reproducing at that point in time is indicated on the indicator 12. Hence, the indicator 12 indicates "1542" which corresponds to 15 minutes and 42 seconds, for example. On the other hand, if the indicator 12 is in the chapter address indication mode, the chapter address of a position on the disc is indicated on the indicator 12. In this case, the indicator 12 indicates "CP12" which corresponds to the program chapter 12, for example.

When setting an address, the setting mode is either switched to the time address setting mode or the chapter address setting mode, by manipulating an address settting mode switching button 14. Next, ten keys are manipulated to set a desired address which is to be searched. When the chapter address "15" is to be set, for example, the setting mode is switched to the chapter address setting mode by manipulating the button 14, and keys "1" and "5" in the ten keys 15 are manipulated. On the other hand, if the time address 19 minutes and 10 seconds is to be set, for example, the setting mode is switched to the time address setting mode by manipulating the button 14, and the keys "1", "9", "1", and "0" in the ten keys 15 are manipulated in that order.

Next, a start button 16 is pushed to start the search. By this manipulation of the button 16, the reproducing apparatus starts to perform a search operation. In addition, the chapter address or the time address set by the above ten keys 15 is simultaneously indicated on the indicator 12, regardless of the indication mode set by the button 13. This indication of the set address continues while the reproducing apparatus is performing the search operation, and when the search is completed, the address at the searched position is indicated on the indicator 12. The address indication mode of the indicator 12 after the above search operation is completed, is the mode which was set by the button 13. For example, when the time address indication mode is selected by the button 13 and the chapter address is set by the button 14 and the ten keys 15, the indicator 12 indicates the set chapter address during the search operation and indicates the time address of the searched position upon completion of the search operation.

Figure 2:
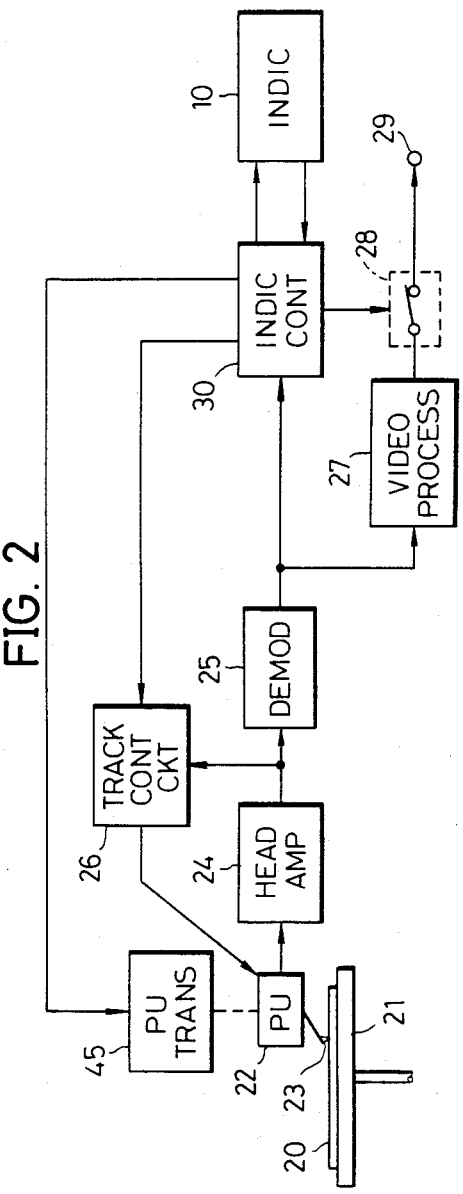
FIG. 2 is a systematic block diagram showing an example of a rotary recording medium reproducing apparatus provided with an address indicator control device according to the present invention.

In FIG. 2, a rotary recording medium (disc) 20 which is recorded with a video signal, is rotated at a predetermined speed by a turntable 21. A reproducing stylus 23 of a signal pickup device 22 makes contact with the recording surface of the disc 20, to pick up and reproduce the recorded signal from the disc 20. In the present embodiment of the invention, the video signal is recorded on the disc 20 as variations in geometrical configuration, and the recorded video signal is reproduced from the disc 20 as variations in the electrostatic capacitance between the disc 20 and an electrode of the reproducing stylus 23. Further, reference signals for performing tracking control are recorded on the disc 20 besides the video signal, and these reference signals are reproduced together with the video signal.

The signal picked up and reproduced from the disc 20, is supplied to a demodulator 25 and a tracking control circuit 26, through a head amplifier 24. The reference signals for tracking control are separated at the tracking control circuit 26, and a tracking control signal is formed from these reference signals. The tracking control signal thus formed at the tracking control circuit 26 is supplied to a tracking coil within the signal pickup device 22. Accordingly, tracking control is performed so that the reproducing stylus 23 accurately scans over the video signal tracks on the disc 20.

On the other hand, the picked up video signal is demodulated at the demodulator 25, and then supplied to a video signal processing circuit 27 wherein a predetermined signal processing is performed. Hence, the demodulated video signal thus subjected to the predetermined signal processing, is supplied to a picture tube (not shown) of a receiver from a terminal 29, through a muting switch 28 which is closed, and reproduced as a reproduced picture. The signal from the demodulator 25 is supplied to an address indicator control device according to the present invention. A concrete construction of an embodiment of an address indicator control circuit 30 is shown in FIG. 3.

Four fields of video signal, for example, is recorded on a spiral track on the disc 20, for one revolution of the disc 20. Further, vertical synchronizing signals are recorded at four positions for one track turn of the disc 20. In each of the vertical blanking periods, a coded address signal (chapter address signal) indicating addresses of program numbers established in order for every plurality of programs recorded on the disc from the outermost peripheral side to the innermost peripheral side of the disc 20 and indicating local addresses within the above plurality of programs, is recorded at a position at the seventeenth H (H indicates a horizontal scanning period) from the rising edge of the vertical synchronizing signal. Further, a coded address signal (time address signal) indicating absolute address of the position of the information signal as a time data indicating the time required to perform normal reproduction from an outermost peripheral position of the disc 20 to the position indicated by the absolute address, is recorded at a position at the eighteenth H from the rising edge of the vertical synchronizing signal.

A chapter address 50 consists of synchronizing bits 51 having six bits, program number bits 52 having eight bits, local address bits 53 having twelve bits, and a parity bit 54 having one bit, that is, the chapter address 50 consists of a total of twenty-nine bits as generally shown in FIG. 4A. Information signals of a plurality of programs are recorded on the disc 20. Numbers such as "1", "2", "3", . . . , are provided in order for every program, from the outer periphery to the inner periphery of the disc 20, and the above program number indicates these numbers provided for the programs. The local address bits 53 indicate a local address within one of the above programs, and for example, the content in the local address bits 53 increases by one for every second, that is, for every fifteen tracks upon normal reproduction. Similarly, a time address signal 55 consists of synchronizing bits 56, minute bits 57 for indicating the time address in minutes, second bits 58 for indicating the time address in seconds, and a parity bit 59, as shown in FIG. 4B.

Description will now be given with respect to the concrete construction of an embodiment of an address indicator control circuit 30 according to the present invention, by referring to FIG. 3. The output of the demodulator 25 is supplied to an address signal detection circuit 32 from a terminal 31. The chapter address signal 50 and the time address signal 55 are detected and separated at this address signal detection circuit 32. The detected address signals are supplied to a comparator 33 and a control circuit 34.

A signal according to the set indication mode obtained by manipulating the address indication mode switching button 13, is applied to the control circuit 34 from the indicator device 10, through a terminal 35. Thus, the control circuit 34 obtains an address signal in accordance with the set indication mode, from the chapter address signal and the time address signal supplied thereto. This address signal hence obtained, is supplied to the indicator device 10 through an address indicator driving circuit 38 and a terminal 39, and indicated on the indicator 12. For example, if the address indication mode is set to the time address indication mode by the button 13, a time address is obtained from the control circuit 34, and the time address is indicated on the indicator 12. For example, if the reproducing stylus 23 is at a position on the disc 20 corresponding to the time address 15 minutes and 42 seconds, "1542" is indicated on the indicator 12.

Next, as described in conjunction with FIG. 1, when the address setting mode is set by the button 14, the address is set by the ten keys 15, and the start button 16 is pushed, a signal in accordance with these operations is applied to the control circuit 34 from the indicator device 10, through the terminal 35. Hence, the control circuit 34 operates to store address set by the ten keys 15, into a memory 36. In a case where the set address is the chapter address "13", for example, the memory 36 stores this chapter address "13". In addition, a timer 37 built into the control circuit 34 is simultaneously started. The timer 37 is set to operate for one second, for example. Furthermore, the control circuit 34 simultaneously supplies the signal of the above set chapter address "13" to the indicator device 10, through the indicator driving circuit 38 and the output terminal 39. Accordingly, the indication on the indicator 12 of the indicator device 10 changes from "1542" to "CP13", and the set chapter address which is to be searched is indicated.

Moreover, simultaneously with the above operations, a search operation control signal is supplied to a control circuit 40 from the control circuit 34. On the other hand, the set address signal stored within the memory 36 is supplied to the comparator 33. This set address signal supplied to the comparator 33 is compared with the address signal of the kind corresponding to this set address signal, from among the address signals obtained from the address signal detection circuit 32. In the above described example, the chapter address signals are compared with each other. The comparator 33 supplies an output error signal obtained as a result of the comparison, to the control circuit 40. According to the signals from the control circuit 34 and the comparator 33, the control circuit 40 supplies a feed transfer control signal and a shift control signal to terminals 41 and 42, respectively. The feed transfer control signal from the terminal 41 is supplied to a transfer device 45, and the signal pickup device 22 is transferred along the radial direction of the disc 20 at a speed according to the address difference obtained as a result of the comparison performed at the comparator 33. As the signal pickup device 22 is transferred and the output error signal of the comparator 33 becomes small, the transfer of the signal pickup device 22 is performed at an exceedingly low speed or substantially stops. At this point in time, the shift control signal from the terminal 42 is supplied to the tracking control circuit 26, and then applied to a tracking control mechanism within the signal pickup device 22. Therefore, the reproducing stylus 23 is successively shifted to an adjacent track to finally reach the position of the set address. The search operation is completed at this point.

During the above described search operation, the control circuit 34 produces a muting signal. This muting signal is applied to the muting switch 28 through a terminal 43, to open this switch 28. Accordingly, while the search operation is being performed, the video signal is not obtained from the terminal 29. This prevents the reproduced picture from becoming a picture full of noise which is unpleasant to watch.

When the above search operation is completed, the output error signal of the comparator 33 becomes zero. Thus, no signals are supplied to the terminals 41 and 42 from the control circuit 40. In addition, a search completion signal is supplied to the control circuit 34 from the comparator 33. Responsive to this operation, the supply of the muting signal to the terminal 43 from the control circuit 34 is stopped, and the switch 28 is accordingly closed.

In a case where the duration of the search operation is longer than the time set (one second in the above example) in the timer 37, the control circuit 34 produces an address signal of the kind of indication mode preset by the button 13 from among the address signals obtained from the address signal detection circuit 32, when supplied with the above search completion signal (in the present example, the time address signal is produced). The address signal thus produced by the control circuit 34 is supplied to the indicator device 10, through the indicator driving circuit 38 and the terminal 39. Accordingly, the position where the search is completed, that is, the time address of the set address position, is indicated on the indicator 12. Hence, during the search operation, the address set by the ten keys 15 which is to be searched, continues to be indicated.

Next, description will be given with respect to a case where the duration of the search operation is exceedingly short. The operation of the indicator device in this case constitutes the feature of the device according to the present invention. If the address position on the disc where the reproducing stylus 23 is at before the search operation and the address position set by the ten key 15 are exceedingly close together, the search operation is completed within an exceedingly short period of time (in the present example, the search is completed within one second) from the time when the search operation is started by manipulating the start button 16. Accordingly, as shown in FIG. 5A, if the reproducing apparatus is performing normal reproduction (NORM) and the search operation (SEARCH) is performed at a time t1, this search operation is completed at a time t2 (t2−t1<1 second). At this point in time, the timer 37 within the control circuit 34 starts a timer operation from the time t1, and operates for a time (one second in the present example) set in this timer 37, until a time t3.

During the interval from the time t2 when the search operation is completed and the time t3 when the operation of the timer 37 is completed, the control circuit 34 operates so that a shift control signal is applied to the terminal 42 through the control circuit 40 to kick back the reproducing stylus 23 by one track towards the outer periphery of the disc 20 for one revolution of the disc 20. Accordingly, the reproducing stylus 23 repeatedly reproduces the same track from among the spiral tracks, between the times t2 and t3, to carry out still reproduction. Therefore, between the times t2 and t3, the reproducing stylus 23 substantially remains at the searched position. Beyond the time t3, the reproducing apparatus is returned to the normal reproduction mode, and starts normal reproduction from the searched address position.

From the time t1 to the time t3 when the timer operation is completed, the control circuit 23 produced a muting signal as shown in FIG. 5B, and supplies this muting signal to the terminal 43. Hence, during the period when the reproducing apparatus is performing a search operation and a still reproduction, that is, between the times t1 and t3, muting is performed by the operation of the switch 28.

In addition, as shown in FIG. 5C, from the time t1 to the time t3 when the timer operation is completed, the control circuit 34 operates to supply the address stored in the memory 36 (the stored address is the chapter address "13" in the present example) to the indicator device 10, through the address indicator driving circuit 38 and the terminal 39. Thus, even if the search operation is completed within an exceedingly short period of time, the indication of the chapter address, that is, "CP13", is indicated on the indicator 12 for a time determined by the timer 37. This enables the operator to visually check the set address which is to be searched on the indicator 12, even when the search operation is completed within an exceedingly short period of time.

The operating time of the timer 37 is not limited to one second. This operating time of the timer 37 can be set to any value, as long as it enables the operator to positively check the indication of the address which is to be searched visually on the indicator 12.

In the above described embodiment, it will seem to the operator as if the search operation required one second to complete on the picture of the television receiver, even when the search operation is completed within an exceedingly short period of time. However, the device may be operated as in the modification described hereinafter.

That is, as shown in FIG. 6A, when the search operation is completed at the time t2, the control circuit 34 may operate to cause the reproducing apparatus to carry out normal reproduction immediately. In this case, as shown in FIG. 6B, the muting signal is only obtained from the terminal 43 beteen the times t1 and t2. However, even in this case, the set address (chapter address) to be searched which is stored within the memory 36 is indicated between the times t1 and t3 as shown in FIG. 6C, similarly as in the case shown in FIG. 5C.

The above address indicator control circuit 30 may be constructed from a micro-computer. The operation of essential parts in such a case, is shown in the flow chart of FIG. 7. After the address which is to be searched (the chapter address "13" in the above example) is set at a step 60, the search operation and the timer operation are started at a step 61. Discrimination is made on whether the reproducing apparatus is in a search mode at a step 62. If the result of the discrimination is YES, a discrimination is made at a step 63 on whether the search operation is completed. In a case where the search operation is still continuing and the result of the discrimination at the step is NO, the set address ("CP13") is indicated at a step 64, and the operation is returned to the step 62.

When the search operation is completed, the result of the discrimination at the step 63 becomes YES, and a discrimination is made at a step 65 on whether the operating time of the timer is exceeded. If the search operation is completed within an exceedingly short period of time and the operating time of the timer is not exceeded, the result of the discrimination at the step 65 becomes NO. In this case, the operation is advanced to the step 64, and then returned to the step 62. Thereafter, when the operating time of the timer is exceeded (when one second is exceeded in the above example), the result of the discrimination at the step 65 becomes YES, and the search operation mode is cleared at a succeeeding step 66. The address indication (time address indication) of the preset indication mode is carried out at a step 67.

If the operating time of the timer is already exceeded at the point when the search operation is completed, the operation advances to the step 66 from the step 65. In addition, if the result of the discrimination at the step 62 is NO, the operation is directly advanced to the step 67.

Further, the present invention is not limited to these embodiments, but various variations and modifications may be made without departing from the scope of the present invention.

What is claimed is:

1. An address indicator control device in a rotary recording medium reproducing apparatus having a reproducing transducer for reproducing a rotary recording medium recorded with at least two kinds of address signals together with an information signal, means for transferring said reproducing transducer to a set address position on said rotary recording medium reproducing apparatus to carry out a search operation, and indicator means for indicating an address, said address indicator control device comprising:

indication mode setting means for setting the kind of address to be indicated on said indicator means;

search address setting means for setting the kind of address to be searched and the address value;

address signal separation means for separating an address signal from a signal reproduced from said rotary recording medium by said reproducing transducer; and control means for indicating an address of the kind and value set by said search address setting means on said indicator means regardless of the setting by said indication mode setting means, at least during the search operation of said reproducing transducer, and until a predetermined time has elapsed from the start of said search operation when the duration of said search operation is shorter than said predetermined time.

2. An address indicator control device as claimed in claim 1 in which said control means comprises memory means for storing the address of the kind and value set by said search address setting means, a timer operating for said predetermined time from the start of said search operation, and means for indicating the kind and value of the address stored in said memory means on said indicator means at least during the time said timer operates.

3. An address indicator control device as claimed in claim 1 in which said predetermined time is selected to a time such that an operator can at least visually check the kind and value of the set address on said indicator means.

4. An address indicator control device as claimed in claim 3 in which said predetermined time is selected to approximately one second.

5. An address indicator control device as claimed in claim 1 in which said reproducing apparatus further has a muting switch for interrupting transmission of the information signal reproduced by said reproducing transducer, and said control means produces and supplies a muting signal to said muting switch while said reproducing transducer is operating, and until said predetermined time has elapsed from the start of said search operation when the duration of said search operation is shorter than said predetermined time.

6. An address indicator control device as claimed in claim 5 in which said reproducing apparatus further has stopping means for stopping said reproducing transducer at an identical track position on said rotary recording medium, and said control means produces a signal for operating said stopping means from a time when said search operation is completed to a time until said predetermined time has elapsed from completion of said search operation when the duration of said search operation is shorter than said predetermined time.

* * * * *